(12) United States Patent
Ariga et al.

(10) Patent No.: US 11,651,663 B2
(45) Date of Patent: May 16, 2023

(54) ARTICLE RECOGNITION DEVICE

(71) Applicant: TOSHIBA TEC KABUSHIKI KAISHA, Tokyo (JP)

(72) Inventors: Norimasa Ariga, Shizuoka (JP); Masaaki Yasunaga, Shizuoka (JP); Tetsuya Nobuoka, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 112 days.

(21) Appl. No.: 17/212,631

(22) Filed: Mar. 25, 2021

(65) Prior Publication Data

US 2021/0209409 A1 Jul. 8, 2021

Related U.S. Application Data

(63) Continuation of application No. 16/416,702, filed on May 20, 2019, now abandoned.

(30) Foreign Application Priority Data

May 22, 2018 (JP) .............................. JP2018-098182

(51) Int. Cl.
*G06K 9/00* (2022.01)
*G06F 18/22* (2023.01)
*G06Q 20/20* (2012.01)

(52) U.S. Cl.
CPC ........... *G06F 18/22* (2023.01); *G06Q 20/203* (2013.01); *G06Q 20/208* (2013.01); *G06V 2201/12* (2022.01)

(58) Field of Classification Search
CPC ...................................................... G06V 10/25
See application file for complete search history.

(56) References Cited

U.S. PATENT DOCUMENTS

| 9,256,775 | B1 | 2/2016 | Yasunaga |
| 10,332,066 | B1 * | 6/2019 | Palaniappan .......... G01G 19/42 |
| 2006/0022047 | A1 | 2/2006 | Sewell et al. |

(Continued)

OTHER PUBLICATIONS

Communication pursuant to Article 94(3) EPC dated Sep. 27, 2021 issued in EP Application No. 19 175 560.2, 5 pages.

(Continued)

*Primary Examiner* — Hadi Akhavannik
(74) *Attorney, Agent, or Firm* — Foley & Lardner LLP

(57) ABSTRACT

An article recognition device includes an image interface, a distance information interface, a support unit, and a processor. The support unit supports an article at a height equal to or greater than a minimum discrimination distance of a distance sensor from a reference plane of the distance sensor and includes a member of which a distance cannot be measured by the distance sensor. The processor acquires a captured image capturing the article supported by the support unit through the image interface, acquires distance information measured by the distance sensor toward the reference plane through the distance information interface, extracts an area having a height equal to or greater than the minimum discrimination distance from the reference plane as an article area of the article from the captured image based on the distance information, and recognizes the article from an image of the article area.

20 Claims, 5 Drawing Sheets

(56) References Cited

U.S. PATENT DOCUMENTS

| | | | |
|---|---|---|---|
| 2009/0144199 A1* | 6/2009 | Oertel | G06Q 10/08 |
| | | | 705/50 |
| 2012/0093370 A1 | 4/2012 | Ding et al. | |
| 2016/0379076 A1 | 12/2016 | Noduoka et al. | |
| 2017/0221192 A1* | 8/2017 | Hyre | H04N 7/181 |
| 2017/0262680 A1* | 9/2017 | Voigt | G06V 10/143 |
| 2018/0191953 A1 | 7/2018 | Stork et al. | |

OTHER PUBLICATIONS

Pastor, Isaac, "A Feasibility Study of an Upper Limb Rehabilitation System Using Kinect and Computer Games," 34th Annual International Conference of the IEEE Engineering in Medicine and Biology Society (EMBS), IEEE, Aug. 28, 2012, pp. 1286-1289, XP032463158.

Extended European Search Report Issued in corresponding European Application No. 19175560.2 dated Oct. 9, 2019, nine (9) pages.

Final Office Action on U.S. Appl. No. 16/416,702 dated Jan. 4, 2021.

Non-Final Office Action on U.S. Appl. No. 16/416,702 dated Sep. 1, 2020.

\* cited by examiner

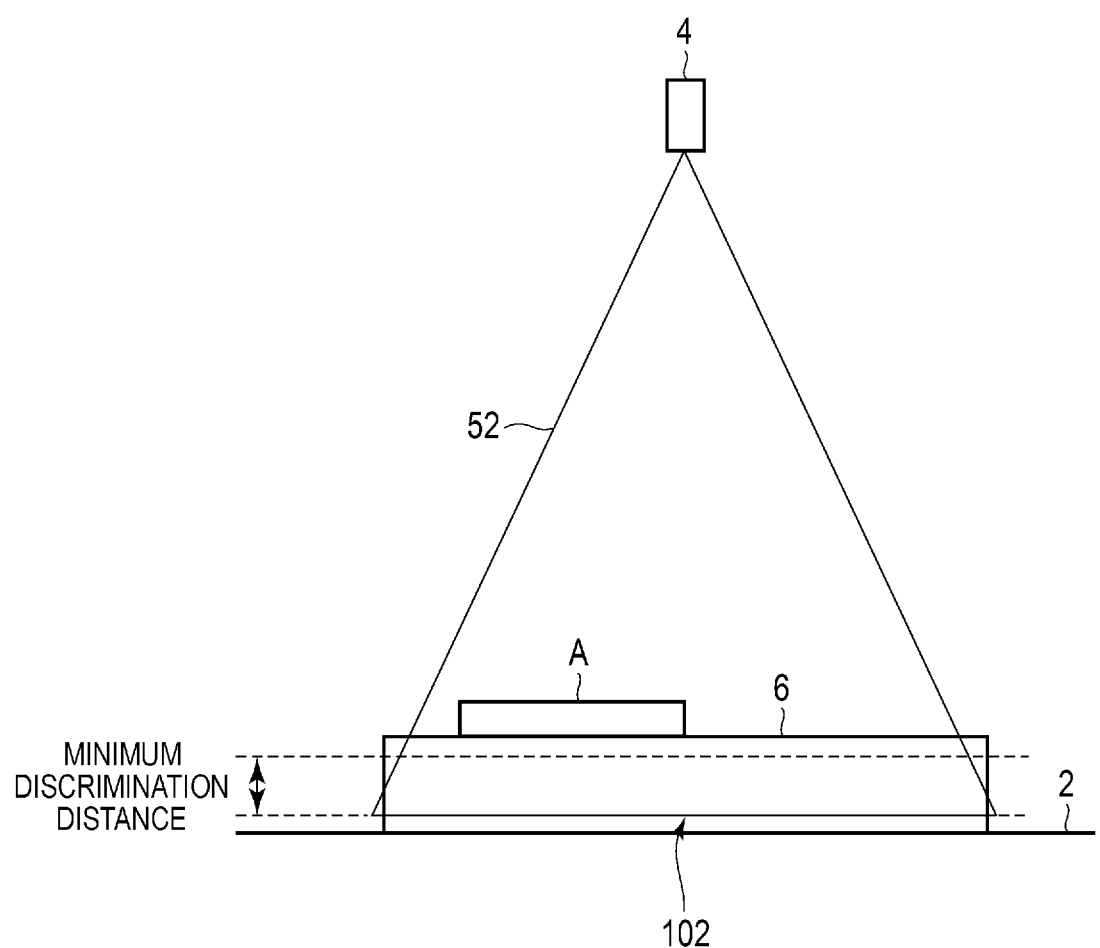

ARTICLE RECOGNITION DEVICE

CROSS-REFERENCE TO RELATED APPLICATIONS

This application is based upon and claims the benefit of priority from Japanese Patent Application No. 2018-098182, filed on May 22, 2018, the entire contents of which are incorporated herein by reference.

FIELD

Embodiments described herein relate generally to an article recognition device.

BACKGROUND

In an article recognition device that recognizes an article such as an item, the article recognition device can recognize an article based on information obtained by capturing an image of the article, measuring a distance with respect to the article, and the like. Such an article recognition device can extract an area having a predetermined height based on the distance information as an article area in which the article appears from the image.

In the related art, however, the article recognition device cannot specify the article area when the height of the article is lower than a height known as the minimum discrimination distance recognizable by the distance sensor of the article recognition device.

DESCRIPTION OF THE DRAWINGS

FIG. 5 is a diagram illustrating a modification example of the operation example of the distance sensor.

DETAILED DESCRIPTION

An exemplary embodiment provides an article recognition device capable of recognizing an article having a height lower than a minimum discrimination distance of a distance sensor.

In general, according to one embodiment, an article recognition device includes an image interface, a distance information interface, a support unit, and a processor. The image interface acquires a captured image. The distance information interface acquires distance information from a distance sensor. The support unit supports an article at a height equal to or greater than a minimum discrimination distance of the distance sensor from a reference plane of the distance sensor and includes a member of which a distance cannot be measured by the distance sensor. The processor acquires the captured image capturing the article supported by the support unit through the image interface, acquires the distance information measured by the distance sensor toward the reference plane through the distance information interface, extracts an area having a height equal to or greater than the minimum discrimination distance from the reference plane as an article area of the article from the captured image based on the distance information, and recognizes the article from an image of the article area.

Hereinafter, embodiments will be described with reference to the drawings.

A checkout device (article recognition device) according to an embodiment settles an item (article). The checkout device captures an image of the item set in the checkout device. The checkout device recognizes the item from the captured image and performs settlement. The checkout device is set up at a store or the like selling items. For example, the checkout device performs settlement processing on an item when the item is placed at a predetermined position or when checkout device accepts a predetermined operation. The checkout device may be installed as a self-register by which a user performs settlement processing. Also, the checkout device may be installed as an ordinary register for a shop clerk of a shop to perform settlement processing.

Figure 1:
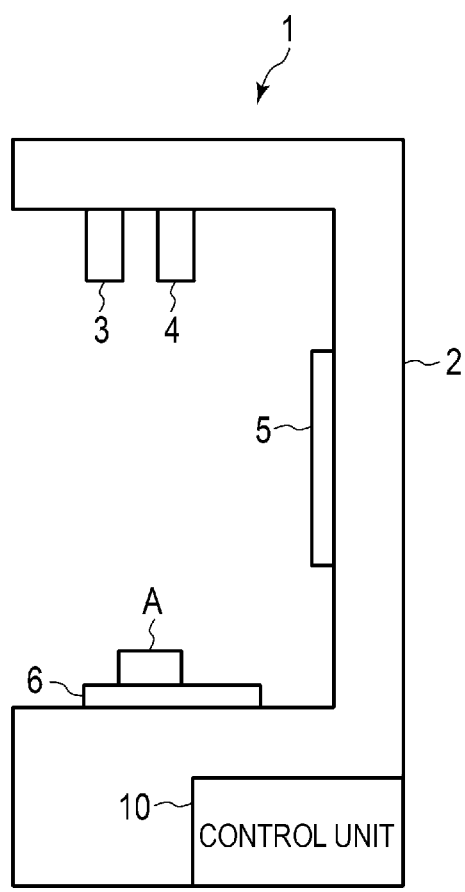
FIG. 1 is a diagram schematically illustrating a configuration example of a checkout device according to an embodiment.

FIG. 1 is a block diagram schematically illustrating a configuration example of a checkout device 1 according to the embodiment. As illustrated in FIG. 1, the checkout device 1 includes a housing 2, a camera 3, a distance sensor 4, an operation panel 5, an installation base 6, a control unit 10, and the like.

The housing 2 is a frame forming an outline of the checkout device 1. The housing 2 is formed so that the installation base 6 can be installed thereon. In an example illustrated in FIG. 1, the housing 2 is formed in a U-shape.

The camera 3 is installed on an upper portion of the housing 2 so as to be directed downward. The camera 3 captures an image of an item A on the installation base 6. That is, the camera 3 is installed so as to capture the image of the item A from above. The camera 3 may be installed so as to capture the image of the item A from obliquely above. The position and direction in which the camera 3 is installed are not limited to a specific configuration. The camera 3 transmits the captured image to the control unit 10.

The distance sensor 4 is installed on an upper portion of the housing 2 so as to be directed downward. The distance sensor 4 measures a distance from the item A placed on the installation base 6 to the distance sensor 4 or a distance from the item A to a plane horizontal to the distance sensor 4.

The distance sensor 4 generates distance information indicating a distance from a predetermined reference plane based on the measurement result. That is, the distance sensor 4 generates the distance information measured toward the predetermined reference plane. For example, the distance information indicates the coordinates of each point in a predetermined three-dimensional coordinate system. The distance sensor 4 transmits the generated distance information to the control unit 10. Also, based on the measurement result, a processor 11 in the control unit 10 may generate the distance information indicating the distance from the predetermined reference plane.

The distance sensor 4 measures the distance with a predetermined resolution. That is, the distance sensor 4 measures a height equal to or greater than a predetermined threshold value (minimum discrimination distance). In this case, the distance sensor 4 calculates the distance from a predetermined reference plane to an area having a height equal to or greater than the minimum discrimination distance.

For example, the distance sensor 4 includes a light source and a sensor for detecting reflected light rays of light rays irradiated from the light source. The distance sensor 4 measures a distance based on the reflected light ray of the light ray (visible light ray or invisible light ray) irradiated from the light source. For example, the distance sensor 4 may perform a Time-of-Flight (ToF) method in which the distance to a measurement target object is measured based on the time until the irradiated light ray is reflected by the measurement target object and reaches the distance sensor 4.

The distance sensor 4 may calculate the distance based on the parallax of each image captured by two cameras (stereo cameras).

The configuration of the distance sensor 4 is not limited to a specific configuration.

The operation panel 5 is an interface for accepting input of an instruction from an operator and displaying various pieces of information to an operator. The operation panel 5 includes an operation unit for accepting an instruction input and a display unit for displaying information.

The operation panel 5 transmits a signal indicating the operation accepted from an operator to the control unit 10 as an operation of the operation unit. In this case, the operation unit includes a touch panel.

The operation panel 5 displays the image from the control unit 10 as an operation of the display unit. For example, the display unit includes a liquid crystal monitor. The display unit is integrally formed with a touch panel as the operation unit.

The operation unit may further include a keyboard or a numeric keypad.

The installation base 6 (support portion) is installed at a lower portion of the housing 2. The installation base 6 is a base which supports the item A. For example, the installation base 6 is formed in a rectangular shape having a predetermined size. The installation base 6 has a thickness equal to or greater than the minimum discrimination distance of the distance sensor 4. That is, the installation base 6 is formed at a height equal to or greater than the minimum discrimination distance towards the distance sensor 4.

The installation base 6 includes members in which the distance sensor 4 cannot measure the distance.

When the distance sensor 4 measures the distance using the ToF method, the installation base 6 is formed from a material which transmits radio waves from the distance sensor 4.

Further, when the distance sensor 4 includes a stereo camera, the installation base 6 is formed from a transparent material which does not appear in the stereo camera.

For example, the installation base 6 is made of an acrylic plate, a glass plate, or the like. Further, the installation base 6 may include a plurality of sharp pointed support members. The configuration of the installation base 6 is not limited to a specific configuration.

The control unit 10 controls the entire checkout device 1. The control unit 10 settles the item A installed in the installation base 6 based on an instruction from an operator or the like.

For example, the control unit 10 receives various inputs from an operator through the operation panel 5. Further, the control unit 10 displays various pieces of information to an operator through the operation panel 5.

Figure 2:
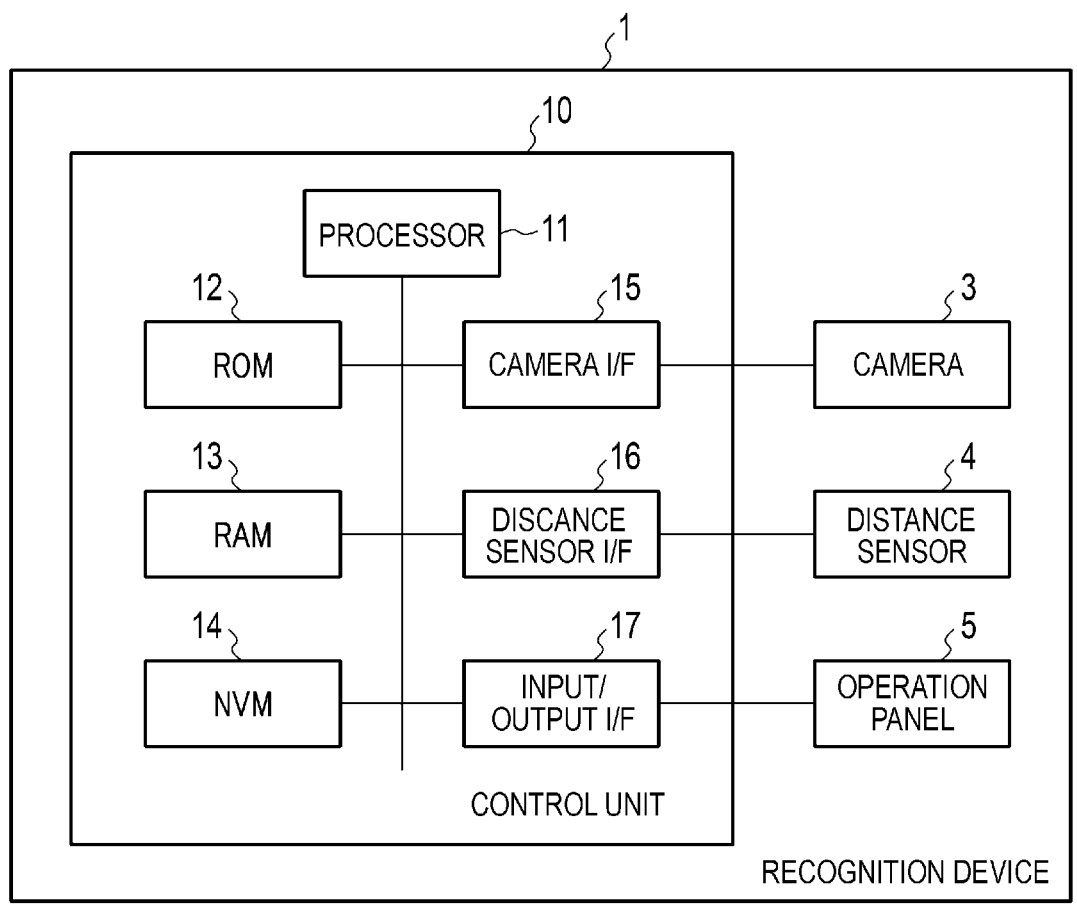
FIG. 2 is a block diagram illustrating a configuration example.

FIG. 2 is a block diagram illustrating a configuration example of the checkout device 1. As illustrated in FIG. 2, the checkout device 1 includes the control unit 10, the camera 3, the distance sensor 4, the operation panel 5, and the like. The control unit 10, the camera 3, the distance sensor 4, and the operation panel 5 are electrically connected. The camera 3, the distance sensor 4, and the operation panel 5 are as described above.

The control unit 10 includes the processor 11, a ROM 12, a RAM 13, an NVM 14, a camera interface 15, a distance sensor interface 16, an input/output interface 17, and the like. The processor 11, the ROM 12, the RAM 13, the NVM 14, the camera interface 15, the distance sensor interface 16, and the input/output interface 17 are electrically connected. The camera interface 15 is electrically connected to the camera 3. The distance sensor interface 16 is electrically connected to the distance sensor 4. The input/output interface 17 is electrically connected to the operation panel 5.

The processor 11 controls the overall operation of the control unit 10. That is, the processor 11 controls the operation of the entire checkout device 1. The processor 11 may be provided with an internal cache, various interfaces, and the like. The processor 11 realizes various processes by executing a program stored in the internal cache, the ROM 12, or the NVM 14 in advance.

Further, some of the various functions realized by the processor 11 executing the program may be realized by a hardware circuit. In this case, the processor 11 controls the function executed by the hardware circuit.

The ROM 12 is a nonvolatile memory in which a control program, control data, and the like are stored in advance. The control program and the control data stored in the ROM 12 are incorporated in advance according to the specification of the control unit 10. The ROM 12 stores, for example, a program for controlling a circuit board of the control unit 10 or the like.

The RAM 13 is a volatile memory. The RAM 13 temporarily stores data being processed by the processor 11 and the like. The RAM 13 stores various application programs based on instructions from the processor 11. Further, the RAM 13 may store data necessary for executing the application program, an execution result of the application program, and the like.

The NVM 14 is a nonvolatile memory capable of writing and rewriting data. The NVM 14 includes, for example, a Hard Disk Drive (HDD), a Solid State Drive (SSD), an Electrically Erasable Programmable Read-Only Memory (Registered Trademark) (EEPROM), or a flash memory. The NVM 14 stores control programs, applications, various data, and the like according to the operational purpose of the control unit 10.

The NVM 14 stores an item database on the items. For example, the item database stores an item name, a price, external dimensions, dictionary information for recognizing the item, and the like in association with each other. The NVM 14 stores the item database in advance. The item database may be updated as appropriate.

The camera interface 15 (image interface) is an interface for sending and receiving data to and from the camera. For example, the camera interface 15 transmits a signal instructing image-capturing to the camera 3 based on the control of processor 11. Also, the camera interface 15 acquires a captured image obtained by image-capturing from the camera 3. For example, the camera interface 15 may support USB connection or may support connection via Ethernet (registered trademark) or camera link.

The distance sensor interface 16 (distance information interface) is an interface for sending and receiving data with the distance sensor 4. For example, the distance sensor interface 16 transmits a signal which causes the distance sensor 4 to acquire the distance information based on the control of the processor 11. Also, the distance sensor interface 16 obtains the distance information from the distance sensor 4. For example, the distance sensor interface 16 may support USB connection or may support connection via Ethernet (registered trademark) or a camera link.

The input/output interface 17 is an interface for sending and receiving data to and from the operation panel 5. For example, the input/output interface 17 receives a signal indicating an operation received from an operator from the operation panel 5. Further, the input/output interface 17 transmits information indicating a screen to be displayed to an operator to the operation panel 5 based on the control of the processor 11. For example, the input/output interface 17 may support USB connection or may support connection via Ethernet or a parallel I/F.

Further, the checkout device 1 may have a configuration according to necessity besides the configuration as illustrated in FIGS. 1 and 2 or a specific configuration may be excluded from the checkout device 1.

Next, the functions realized by the processor 11 will be described. The following functions are realized by the processor 11 executing programs stored in the ROM 12, the NVM 14, or the like.

First, the processor 11 has a function of acquiring an image (captured image) obtained by capturing an image of the installation base 6 on which the item A is placed.

The processor 11 determines whether to start settlement processing. For example, when it is detected that the item A is placed by a user on the installation base 6, the processor 11 determines to start settlement processing. The processor 11 detects that the item A is placed on the installation base 6 based on the image from the camera 3. In addition, the processor 11 may accept an operation indicating that settlement processing is started from a user.

When it is determined that settlement processing is to be started, the processor 11 captures an image including the item A. For example, the processor 11 transmits a signal for capturing an image to the camera 3. The processor 11 acquires a captured image from the camera 3. In order to capture an image, the processor 11 may set a capturing parameter to the camera 3.

Further, the processor 11 may acquire a captured image from an external device.

In addition, the processor 11 has a function of acquiring distance information from the distance sensor 4.

When it is determined that settlement processing is to be started, the processor 11 acquires the distance information from the distance sensor 4. For example, the processor 11 sends a signal for measuring the distance to the distance sensor 4. The processor 11 obtains the distance information from the distance sensor 4.

The processor 11 may acquire the distance information after acquiring the captured image. Further, the processor 11 may acquire the distance information with the captured image at the same time. Further, the processor 11 may acquire the distance information before acquiring the captured image.

Figure 3:
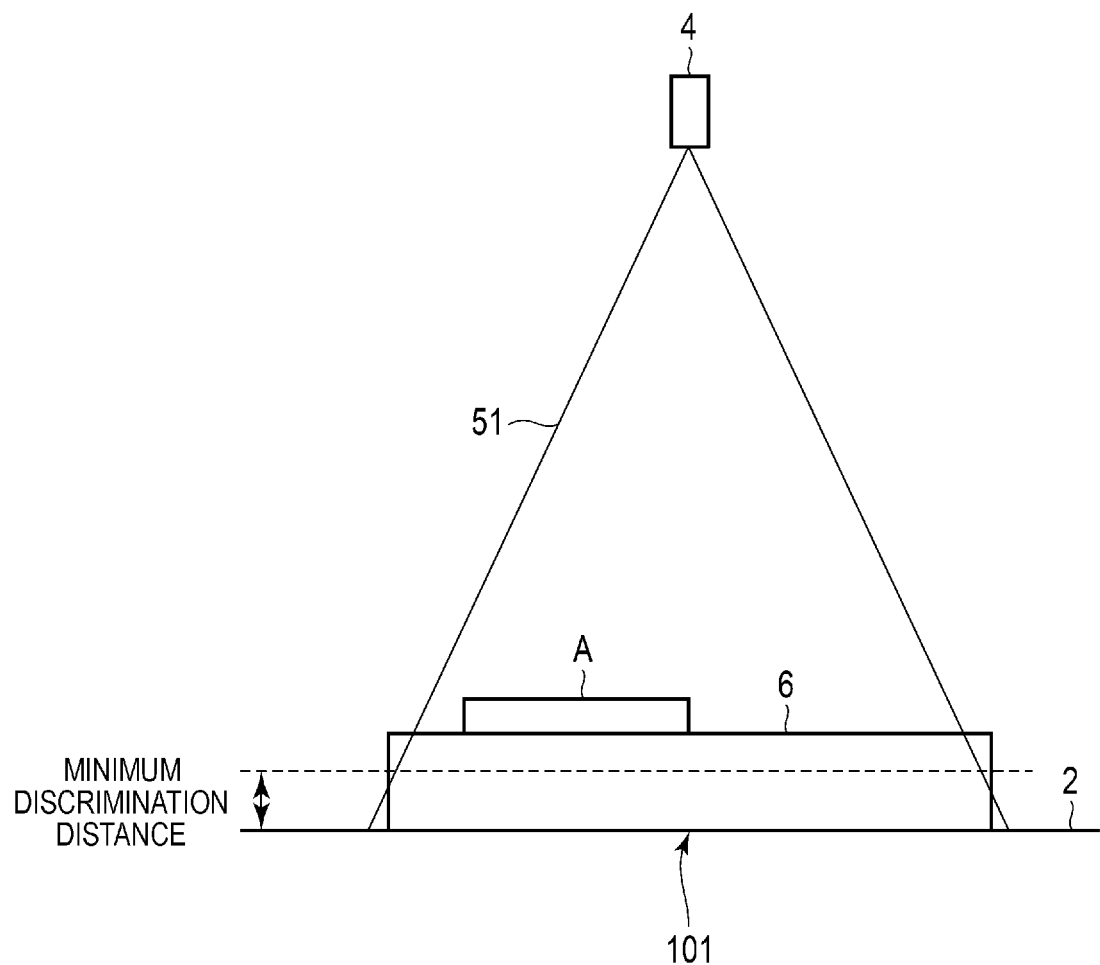
FIG. 3 is a diagram illustrating an operation example of a distance sensor.

FIG. 3 is a diagram illustrating an operation example in which the distance sensor 4 acquires the distance information. As illustrated in FIG. 3, the distance sensor 4 sets a measurement range 51. The measurement range 51 is an area where the distance sensor 4 measures the distance. That is, the distance sensor 4 measures the distance of each portion in the measurement range 51. The measurement range 51 is formed in a conical shape with the distance sensor 4 as an apex.

Further, the distance sensor 4 sets a reference plane 101 on an end surface (bottom surface of the cone) of the measurement range 51. The distance sensor 4 measures the distance from the distance sensor 4 to an object in the measurement range 51. For example, the processor 11 sets the reference plane 101 to the distance sensor 4.

The reference plane 101 is set to a plane obtained by extending the bottom surface of the installation base 6. That is, the reference plane 101 is set on the housing 2 where the installation base 6 is installed. When the height of the installation base 6 is high enough, the reference plane 101 does not need to be on the housing 2 where the installation base 6 is installed.

As a result, the distance sensor 4 calculates the distance from the housing 2 where the installation base 6 is set.

As described above, the installation base 6 is formed to have a thickness equal to or greater than the minimum discrimination distance. Therefore, the installation base 6 supports the item A in a position which is close to the distance sensor 4 by a distance equal to or greater than the minimum discrimination distance from the reference plane 101.

The distance sensor 4 measures the height (sum of the thickness of the installation base 6 and the height of the item A) of an upper surface of the item A supported at a height equal to or greater than the minimum discrimination distance.

In addition, the processor 11 has a function of extracting an item area (item area) in which an item appears from the captured image based on the distance information.

The area where the upper surface of the item appears is higher than the reference plane 101 by the height of the item and the thickness of the installation base 6. Therefore, the processor 11 can extract an area higher than the reference plane 101 as an item area even when the height of the item is low.

When a plurality of items appears in the captured image, the processor 11 extracts the item area of each item.

In addition, the processor 11 has a function of recognizing the item in the item area.

For example, when the item has identification information identifying itself, the processor 11 identifies the item based on the identification information. For example, the identification information may be a barcode, a QR code (registered trademark), a letter, a number, or a mark. The processor 11 retrieves the identification information from the image of the item area and reads out the found identification information. Based on the reading result, the processor 11 acquires the item code indicating the item of the item image.

Further, the processor 11 may recognize the item in the item area by object recognition. The processor 11 acquires the dictionary information of each piece of item information from the item database stored in the NVM 14 and the like.

For example, the processor 11 compares the dictionary information with the image in the item area. The processor 11 specifies the item code of the item information corresponding to the dictionary information matching the image of the item area as the item code indicating the item of the item image.

When a plurality of item areas is extracted, the processor 11 recognizes the item of each item area.

The method by which the processor 11 recognizes the item is not limited to a specific method.

Further, the processor 11 may determine whether item recognition is properly performed based on the outer dimensions of the item stored in advance, the area of the item area of the item, and the like. The processor 11 may determine whether item recognition is properly performed based on the outer dimensions of the item stored in advance, the height of the item area of the item, and the like.

Further, the processor 11 has a function of settling the recognized item.

The processor 11 refers to the item database and acquires the price based on the item code of the recognized item and the like. Further, the processor 11 may acquire the price of the item specified from an external device.

The processor 11 settles the item based on the price of the item. For example, the processor 11 accepts input of credit card information from a user. For example, the processor 11 may acquire credit card information using a credit card reader or the like. The processor 11 settles the item based on the credit card information.

The processor 11 may settle items using cash, debit cards, electronic money, or the like. The way in which processor 11 settles items is not limited to a specific method.

Figure 4:
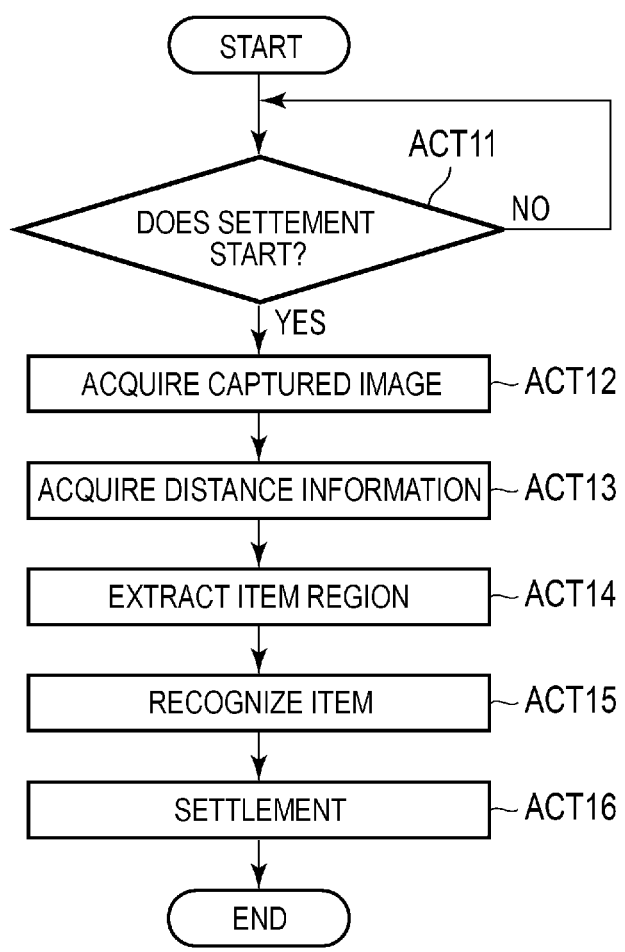
FIG. 4 is a flowchart illustrating an operation example.

Next, an operation example of the checkout device 1 will be described. FIG. 4 is a flowchart for describing the operation example of the checkout device 1.

First, the processor 11 of the checkout device 1 determines whether to start settlement processing (ACT11). When it is determined that settlement processing is not started (ACT11, NO), the processor 11 returns to ACT11.

When it is determined that settlement processing is to be started (ACT11, YES), the processor 11 acquires the captured image using the camera 3 (ACT12). When the captured image is acquired, the processor 11 acquires the distance information using the distance sensor 4 (ACT13).

When the distance information is acquired, the processor 11 extracts the item area based on the distance information (ACT14). When the item area is extracted, the processor 11 recognizes the item in the item area (ACT15).

When the item is recognized, the processor 11 settles the recognized item (ACT16). When the recognized item is settled, the processor 11 ends the operation.

Next, a modification example of the operation example in which the distance sensor 4 acquires distance information will be described. FIG. 5 is a diagram illustrating another example of the operation example in which the distance sensor 4 acquires the distance information.

As illustrated in FIG. 5, the distance sensor 4 sets a measurement range 52. The measurement range 52 is an area where the distance sensor 4 measures the distance. That is, the distance sensor 4 measures the distance of each portion in the measurement range 52. The measurement range 52 is formed in a conical shape with the distance sensor 4 as an apex.

Further, the distance sensor 4 sets the reference plane 102 on an end surface (bottom surface of the cone) of the measurement range 52. That is, the distance sensor 4 measures the distance from the reference plane 102. For example, the processor 11 sets reference plane 102 to the distance sensor 4.

The reference plane 102 is set at a position apart from the upper surface of the installation base 6 by a distance equal to or greater than the minimum discrimination distance. Further, the reference plane 102 is set at a position closer to the distance sensor 4 than the bottom surface of the installation base 6. That is, the reference plane 102 is set between the upper surface and the bottom surface of the installation base 6 and on a plane separated from the upper surface of the installation base 6 by a distance equal to or greater than the minimum discrimination distance. Therefore, the item A installed on the installation base 6 is supported at a height equal to or greater than the minimum discrimination distance from the reference plane 102.

The distance sensor 4 measures the height (sum of the thickness of the installation base 6 and the height of the item A) of the upper surface of the item A supported at a height equal to or greater than the minimum discrimination distance.

Further, instead of the installation base 6, the checkout device 1 may include a wire or the like for supporting items at a height equal to or greater than the minimum discrimination distance from the reference plane. For example, the checkout device 1 may include a plurality of horizontally extending wires.

Instead of the installation base 6, the checkout device 1 may include a support plate or the like for supporting items at a height equal to or greater than the minimum discrimination distance from the reference plane. For example, the support plate is suspended at a predetermined height by a wire extending downward from an upper portion of the checkout device 1. Also, the support plate is formed from a material of which the height cannot be detected by the distance sensor 4.

The checkout device configured as described above has an installation base which supports an item at a height equal to or greater than the minimum discrimination distance of the distance sensor. The checkout device acquires a captured image of the item placed in the installation base. In addition, the checkout device obtains the distance information indicating the height of the item placed in the installation base by using the distance sensor.

The checkout device extracts the item area from the captured image based on the distance information. That is, the checkout device extracts the area higher than the reference plane as the item area. Since the thickness of the installation base is equal to or greater than the minimum discrimination distance, even when the height of the item is lower than the minimum discrimination distance, the upper surface of the item is located at the height equal to or greater than the minimum discrimination distance. As a result, the checkout device can extract the upper surface of the item as an area higher than the reference plane. Therefore, the checkout device can appropriately extract the item area from the captured image using the distance information even when the height of the item is lower than the minimum discrimination distance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article recognition device, comprising:
an image interface configured to acquire a captured image;
a distance information interface configured to acquire distance information from a distance sensor;
a support configured to support an article at a height equal to or greater than a minimum discrimination distance of the distance sensor from a reference plane of the distance sensor and includes a member of which a distance cannot be measured by the distance sensor, the minimum discrimination distance based on a resolution of the distance sensor;
a housing supporting the support, the housing and the support being different components from each other, the support being positioned so that a surface of the support contacts a surface of the housing, the reference plane of the distance sensor disposed at the surface of the housing or within the support; and a processor configured to:
acquire the captured image of the article supported by the support through the image interface;
acquire the distance information measured by the distance sensor toward the reference plane through the distance information interface;
extract an area of the article from the captured image, wherein the area has a height equal to or greater than the minimum discrimination distance from the reference plane, and wherein the area is an article area of the captured image; and
recognize the article from a portion of the captured image corresponding to the article area extracted based on the distance information.

2. The article recognition device according to claim 1, wherein
the support is an installation base having a thickness equal to or greater than the minimum discrimination distance and formed from a material of which a distance cannot be measured by the distance sensor.

3. The article recognition device according to claim 2, wherein
the reference plane is set to a plane obtained by expanding a bottom surface of the installation base.

4. The article recognition device according to claim 2, wherein
the reference plane is set to a plane which is located between an upper surface and a bottom surface of the installation base and apart from the upper surface of the installation base by a distance equal to or greater than the minimum discrimination distance.

5. The article recognition device according to claim 1, further comprising:
a camera connected to the image interface; and
the distance sensor.

6. The article recognition device according to claim 1, wherein the processor is configured to ignore an area having a height less than a minimum discrimination distance from the reference plane.

7. The article recognition device according to claim 1, wherein the support includes a plate suspended at a predetermined height by a wire extending downward from an upper portion of the article recognition device.

8. The article recognition device according to claim 7, wherein the plate is made of a material not detectable by the distance sensor.

9. A device for identifying a digital processing region and recognizing one or more items therein, the device comprising:
an image sensor having a first field of view;
a distance sensor having a second field of view no less than the first field of view, the distance sensor is configured to ignore objects having heights less than a minimum discrimination distance, the minimum discrimination distance based on a resolution of the distance sensor;
a support for receiving an article having a height less than the minimum discrimination distance, wherein the support raises the article toward the distance sensor such that the distance sensor registers an area covered by the article, and a processor configured to:
determine the digital processing region based on the first field of view, the second field of view, and the area covered by the article,
process a portion of image data of an image of the article captured by the image sensor, within the area covered by the article, and corresponding to the digital processing region, and
identify commodity information of the article.

10. The device of claim 9, wherein the area covered by the article is a subset of the second field of view and wherein the processor excludes image data of the image of the article captured by the image sensor outside of the area covered by the article from processing.

11. The device of claim 9, wherein the commodity information of the article includes a name and a price of the article for checkout.

12. The device of claim 9, wherein the support includes a base resting on a reference plane, wherein the base has a thickness equal to or greater than the minimum discrimination distance and formed from a material of which a distance cannot be measured by the distance sensor.

13. The device of claim 9, wherein the support includes a plate suspended at a predetermined height by a wire extending downward from an upper portion of the article recognition device, the plate made of a material not detectable by the distance sensor.

14. A method for recognizing thin items during check out, the method comprising:
capturing at least one image in a range;
detecting, by a distance sensor, a distance between an article and the distance sensor when the article is placed within the range, wherein the distance sensor ignores objects having heights less than a minimum discrimination distance, the article has a thickness less than the minimum discrimination distance, the minimum discrimination distance based on a resolution of the distance sensor;
supporting the article using a support to reach a height equal to or greater than the minimum discrimination distance;
extracting a processing area of the article based on the detected distance; and
recognizing commodity information associated with the article from image data of a portion, corresponding to the processing area, of the at least one image.

15. Method of claim 14, wherein capturing at least one image in a range comprises acquiring the at least one image using a digital camera.

16. The method of claim 14, further comprising including the support in the range.

17. The method of claim 16, wherein the support includes a base resting on a reference plane, wherein the base has a thickness equal to or greater than the minimum discrimination distance and formed from a material of which a distance cannot be measured by the distance sensor.

18. The method of claim 16, wherein the support includes a plate suspended at a predetermined height by a wire extending downward from an upper portion of the article recognition device, the plate made of a material not detectable by the distance sensor.

19. Method of claim 16, further comprising:
searching a database having records of article features and their associated commodity information; and
matching one or more of the article features to the image data of the portion, corresponding to the processing area, of the at least one image for identifying relevant commodity information.

20. The method of claim 16, further comprising accepting a payment to a price included in the commodity information associated with the article.

\* \* \* \* \*